UNITED STATES PATENT OFFICE 2,660,597

ALKYL SILICON COMPOUNDS

Paul W. Shafer, Niagara Falls, and George H. Wagner, Kenmore, N. Y., assignors, by mesne assignments, to Union Carbide and Carbon Corporation, a corporation of New York No Drawing. Application December 17, 1948, Serial No. 65,978

9 Claims. (Cl. 260—448.2)

This invention relates to the preparation of alkyl silicon compounds by the direct reaction of an alkane with a chlorosilane.

A number of efforts have been made to react alkanes with silicon chlorides, but such efforts have met with little or no success. Most of the prior investigators have attempted to induce a reaction between an alkane and silicon tetrachloride by resorting to high reaction temperatures of the order of 800° to 1000° C., but the yields even under these drastic conditions have apparently been very poor.

We have found that alkyl chlorosilanes can be obtained in improved yields by reacting an alkane with a chlorosilane containing at least one Si-H bond, such as trichlorosilane, $HSiCl_3$, or dichlorosilane, $H_2SiCl_2$, in the presence of a catalyst of the Friedel-Crafts type. In the presence of such catalysts, the reaction proceeds at an elevated temperature, the preferred range being 300° to 500° C. It is essential that the chlorosilane employed contain at least one Si-H bond, as we have determined that silicon tetrachloride does not react with alkanes under our reaction conditions. We have established that the reaction of methane with trichlorosilane proceeds in an entirely different manner than the thermal reaction of methane with silicon tetrachloride. Under our conditions, the reaction between methane and trichlorosilane proceeds with the formation of methyl trichlorosilane and hydrogen, whereas the release of hydrogen chloride has been postulated in the thermal reaction of methane with silicon tetrachloride.

In general, by our reaction we replace one or more hydrogen atoms attached to the silicon atom of the chlorosilane with an alkyl radical. When methane is employed in the reaction we form only the methyl chlorosilanes, and when ethane is employed in the reaction we obtain both ethyl and methyl chlorosilanes. When higher alkanes are employed in the reaction, methyl chlorosilanes are also obtained, as well as higher alkyl chlorosilanes, which may or may not contain the same number of carbon atoms in the alkyl radical as in the alkane used. Thus, when isobutane is reacted with trichlorosilane under our conditions, both methyl chlorosilanes and propyl chlorosilanes are found in the reaction products.

In the reaction of methane with trichlorosilane, the yield of methyl trichlorosilane increases with temperature, and in the reaction of ethane with trichlorosilane, the total yield of alkyl trichlorosilanes increases with temperature, but the proportion of the methyl trichlorosilane in the product first increases with the reaction temperature and then declines. Thus, the proportion of ethyl trichlorosilane to methyl trichlorosilane in the reaction products can be adjusted by controlling the reaction temperature. The effect of temperature on the yield of alkyl trichlorosilanes is given in Tables I and II. The data were obtained by reacting 0.5 mole of methane (8 grams) or ethane (15 grams), respectively, in a closed reactor having a volume of 300 cc. at the specified temperatures and pressures with 0.5 mole of trichlorosilane (68 grams) in the presence of 5 cc. (measured at 10° C.) of boron trichloride as a catalyst.

TABLE I

Reaction of methane with trichlorosilane

| Temperature, °C. | Max. pressure (p. s. i.) | Time, hrs. | Results | | |
|---|---|---|---|---|---|
| | | | $HSiCl_3$ recovered, grams | $SiCl_4$ formed, grams | Mol percent conversion of $HSiCl_3$ to $CH_3SiCl_3$ |
| 375 | 2,120 | 2 | 14 | 27 | 19 |
| 425 | 2,480 | 2 | 13 | 28 | 18 |
| 475 | 2,440 | 2 | 11 | 30 | 25 |

TABLE II

Reaction of ethane with trichlorosilane

| Temperature, °C. | Max. pressure (p. s. i.) | Time, hrs. | Results | | | |
|---|---|---|---|---|---|---|
| | | | $HSiCl_3$ recovered, grams | $SiCl_4$ formed, grams | Mol percent conversion of $HSiCl_3$ to— | |
| | | | | | $Ch_3SiCl_3$ | $C_2H_5SiCl_3$ |
| 200 | 1,000 | 16 | 59 | 0 | 0 | 0 |
| 250 | 1,300 | 17 | 58 | <1 | 0 | 0 |
| 300 | 1,670 | 14 | 12 | 21 | 8 | 11 |
| 325 | 1,900 | 15 | <3 | 24 | 22 | 13 |
| 375 | 2,100 | 14 | <3 | 25 | 19 | 13.5 |
| 425 | 2,900 | 2 | <3 | 23 | 20 | 18 |

It will be noted from the results of Tables I and II that, at the temperatures required for alkylation of trichlorosilane, appreciable amounts of silicon tetrachloride are formed, apparently by rearrangement of the trichlorosilane and not as a coproduct of the alkylation reaction. Also, it will be noted that, at comparable reaction temperatures, the molar conversion of trichlorosilane to methyl trichlorosilane is the same when ethane is employed as when methane is the reactant alkane. Since, in the former case, ethyl trichlorosilane is also formed, a more efficient utilization of the trichlorosilane results.

There are indications that the amount of trichlorosilane converted to silicon tetrachloride can be reduced by lowering the catalyst concentration, for instance, to less than 2% by weight of the reactants. Thus, in an otherwise comparable experiment to the run at 375° C. in Table II, but using only 1 cc. of boron trichloride, the recovered trichlorosilane was 6 grams and the silicon tetrachloride formed was only 11 grams, while the molar conversion of trichlorosilane to methyl trichlorosilane was 21% and to ethyl trichlorosilane 23%. In another experiment using larger quantities of reactants, i. e. 120 grams of ethane (4 moles) and 542 grams of trichlorosilane (4 moles) but a smaller concentration of catalyst, 1 cc. of boron trichloride, conducted at 305° C. and 1850 p. s. i. for 16 hours, the amount of silicon tetrachloride formed in relation to the recovered trichlorosilane was reduced, there being obtained 160 grams of trichlorosilane and 85 grams of silicon tetrachloride while the molar conversion of trichlorosilane to methyl chlorosilane was 10% and to ethyl trichlorosilane 20%. However, in the absence of any catalyst at all, we obtained substantially no reaction between trichlorosilane and methane, ethane, propane and isobutane at temperatures of 375° to 450° C. and comparable pressures and periods of experiment. Thus, at least a trace of a Friedel-Crafts catalyst is essential to carry out the alkylation reaction. On the other hand, the amount of catalyst used can be quite large. For instance, in a large scale experiment using 120 grams of ethane and 542 grams of trichlorosilane and 40 cc. of boron trichloride carried out at 318° C. and 2280 p. s. i. for two hours, the molar conversion of trichlorosilane to methyl trichlorosilane was 16%, and to ethyl trichlorosilane 13%, but 160 grams of silicon tetrachloride were formed and 60 grams of trichlorosilane recovered. The use of large amounts of catalyst has the advantage, comparing the larger scale runs with 40 cc. and 1 cc. of boron trichloride, respectively, that the reaction time required at the higher catalyst concentration to obtain about the same total yield of alkyl chlorosilanes is much shorter, but this is offset by the fact that more trichlorosilane is converted to silicon tetrachloride. In general, therefore, the amount of catalyst may be 0.05% to 10% by weight of the reactants.

Friedel-Crafts catalysts suitable for use in the reaction include boron trichloride, aluminum trichloride, boron trifluoride, and aluminum tribromide, but other catalysts of this type can be used. Boron trichloride is the preferred catalyst.

The following examples will illustrate further the practice of the invention:

EXAMPLE 1

One-half mol of trichlorosilane (68 grams), approximately one-half mol of methane (8 grams), and 5 cc. of BCl₃ were charged to a 300 cc. Monel reactor. The reactor was closed and heated to 475° C. for 2 hours. The maximum pressure during this period was 2420 p. s. i. After cooling to room temperature the gas phase remaining was metered and found to amount to 0.55 mol of which 26 volume percent was hydrogen. Thus about .14 mol of hydrogen was formed. The liquid product contained 18.2 grams (0.12 mol) of methyltrichlorosilane, representing a yield of 24%. This reaction may thus be represented as follows:

$$CH_4 + SiHCl_3 \rightarrow CH_3SiCl_3 + H_2$$

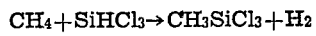

EXAMPLE 2

In a stainless steel pressure reactor there were placed 48 cc. (0.5 mole) of trichlorosilane, 48 cc. (0.5 mol) of isobutane and 5 cc. of boron trichloride catalyst. The reaction vessel was closed and heated at 375° C. for sixteen hours during which time a pressure of 1880 p. s. i. was attained. After opening the reactor the 89 g. of liquid material was fractionated and analyzed with the following results: trichlorosilane, <3 g.; silicon tetrachloride, 18 g.; methyltrichlorosilane, 13.8 g. (a yield of 18%); propyltrichlorosilane, 6 g. (a yield of 7%) (per cent Cl 59.9 theory=60%); residue, 12 g.

EXAMPLE 3

In a Monel metal pressure reactor there were placed 48 cc. (0.5 mol) of trichlorosilane, 57 cc. (0.5 mol) of normal pentane and 5 cc. of boron trichloride catalyst. The reaction vessel was closed and heated at 375° C. for fourteen hours during which time a pressure of 1950 p. s. i. was attained. After opening the reactor the 88 g. of liquid material obtained was fractionated and analyzed with the following results: silicon tetrachloride, 20 g.; methyltrichlorosilane, 10.6 g. (a yield of 14%); residue, 11 g. The remainder of the material, 24 g., distilled from 68–167° C. (744 mm.), $d^{25}$ 1.18–1.26, and was a mixture of alkyl chlorosilanes.

EXAMPLE 4

In a stainless steel pressure reactor there were placed 48 cc. (0.5 mol) of trichlorosilane, 54 cc. (0.5 mol) of cyclohexane and 5 cc. of boron trichloride catalyst. The reaction vessel was closed and heated at 375° C. for fourteen hours. After opening the reactor the 102 g. of liquid material obtained was fractionated and analyzed with the following results: trichlorosilane, <2 g.; silicon tetrachloride, about 19 g.; methyltrichlorosilane, 6.7 g. (a yield of 9%). A compound boiling from 116–119° C. at 56 mm.; 14 g., $d^{25}$ 1.22, per cent Cl 49.7, was obtained in 13% yield, which corresponds to an alkyl chlorosilane having six carbon atoms in the alkyl radical.

EXAMPLE 5

Fifteen (15) grams of ethane (0.5 mol), 68 grams of trichlorosilane (0.5 mol), and 5 grams of aluminum chloride were charged to a stainless steel reactor having a volume of 300 cc. The contents of the reactor were heated to 375° C. for 14 hours under a maximum pressure of 1800 p. s. i. At the end of this time slightly more than 60 grams of liquid products were obtained of which 23 grams were trichlorosilane, 9 grams were silicon tetrachloride, 1.6 grams were methyl trichlorosilane (2% yield), 0.24 gram was dimethyl dichlorosilane, 13 grams were ethyltrichlorosilane (16% yield) and 7 grams were a residue.

EXAMPLE 6

Eight (8) grams of methane (0.5 mol), 68 grams of trichlorosilane (0.5 mol), and 0.9 gram of boron trifluoride were charged to a stainless steel reactor having a volume of 300 cc. The contents of the reactor were heated to 375° C. for 2 hours under a maximum pressure of 2100 p. s. i. At the end of this time 54 grams of liquid products were obtained of which 21 grams were trichlorosilane, 1 gram was dichlorosilane, 17 grams were silicon tetrachloride, 6 grams were trimethylchlorosilane, 0.89 gram was dimethyldichlorosilane and 4 grams were a residue.

EXAMPLE 7

In a stainless steel pressure reactor having a capacity of 300 cc. there were placed eight (8) grams of methane (0.5 mol), 68 grams of trichlorosilane (0.5 mol), and 6 grams of aluminum bromide. The contents of the reactor were heated to 375° C. for 2 hours under a maximum pressure of 2050 p. s. i. At the end of this time 60 grams of liquid products were obtained of which 25 grams were trichlorosilane, 3 grams were dichlorosilane, 8 grams were silicon tetrachloride, 13 grams were methylchlorosilane and 6 grams were a residue.

EXAMPLE 8

Fifteen (15) grams of ethane (0.5 mol) and 50.5 grams of dichlorosilane (0.5 mol) and 5 cc. of boron trichloride were charged to a stainless steel reactor having a capacity of 300 cc. The contents of the reactor were heated to 325° C. for 2.5 hours under a maximum pressure of 2240 p. s. i. At the end of this time, there were recovered 29 grams of chlorosilanes, 6 grams of silicon tetrachloride, 2.8 grams of methyl chlorosilanes and 3.5 grams of ethyl chlorosilanes.

As shown in the above examples, considerable pressure is generated when the reactants are heated to reaction temperatures in a closed vessel. The reaction may be carried out at lower pressures by passing the reactants continuously through a reaction vessel in the presence of a Friedel-Crafts catalyst. Irrespective of the manner of conducting the reaction, the reactants may be in vapor phase, the liquid phase, or partly in the liquid phase and partly in the vapor phase, depending on the temperatures and pressures involved.

What is claimed is:

1. Process for making alkyl chlorosilanes which comprises heating an alkane with trichlorosilane at a temperature of at least 300° C. in the presence of a catalyst of the Friedel-Crafts type.

2. Process for making methyl chlorosilanes which comprises heating methane with trichlorosilane at a temperature of 300° to 500° C. in the presence of a catalyst of the Friedel-Crafts type.

3. Process for making alkyl chlorosilanes which comprises heating ethane with trichlorosilane at a temperature of 300° to 500° C. in the presence of a catalyst of the Friedel-Crafts type, and recovering methyl trichlorosilane and ethyl trichlorosilane from the reaction products.

4. Process as claimed in claim 2 in which the catalyst is boron trichloride.

5. Process as claimed in claim 3 in which the catalyst is boron trichloride.

6. Process for making alkyl chlorosilanes which comprises heating an alkane with trichlorosilane at a temperature of 300° to 500° C. in the presence of an amount of a Friedel-Crafts type catalyst from 0.05 to 10% by weight of the reactants.

7. Process for making alkyl chlorosilanes which comprises heating ethane with trichlorosilane at a temperature of 300° to 500° C. in the presence of an amount of a Friedel-Crafts type catalyst less than 2% by weight of the reactants.

8. Process for making alkyl chlorosilanes which comprises heating an alkane at a temperature of at least 300° C. with a chlorosilane containing only hydrogen and chlorine attached to the silicon atom in the presence of a catalyst of the Friedel-Crafts type.

9. Process for making alkyl chlorosilanes which comprises heating an alkane at a temperature of at least 300° C. with a chlorosilane containing only hydrogen and chlorine attached to the silicon atom in the presence of a Friedel-Crafts type catalyst selected from the class consisting of $BF_3$, $BCl_3$, $AlCl_3$ and $AlBr_3$.

PAUL W. SHAFER.
GEORGE H. WAGNER.

References Cited in the file of this patent

UNITED STATES PATENTS

| Number | Name | Date |
|---|---|---|
| 2,379,821 | Miller | July 3, 1945 |
| 2,405,019 | Dalin | July 30, 1946 |
| 2,407,181 | Scott | Sept. 3, 1946 |
| 2,443,898 | Ellingboe | June 22, 1948 |
| 2,469,355 | De Pre | May 10, 1949 |

OTHER REFERENCES

Barry: "Jour. Am. Chem. Soc.," vol. 69, page 2916 (1947).